Nov. 16, 1965    P. L. CALA    3,218,448
LAMP MOUNTING BRACKET
Filed Oct. 18, 1962    2 Sheets-Sheet 1
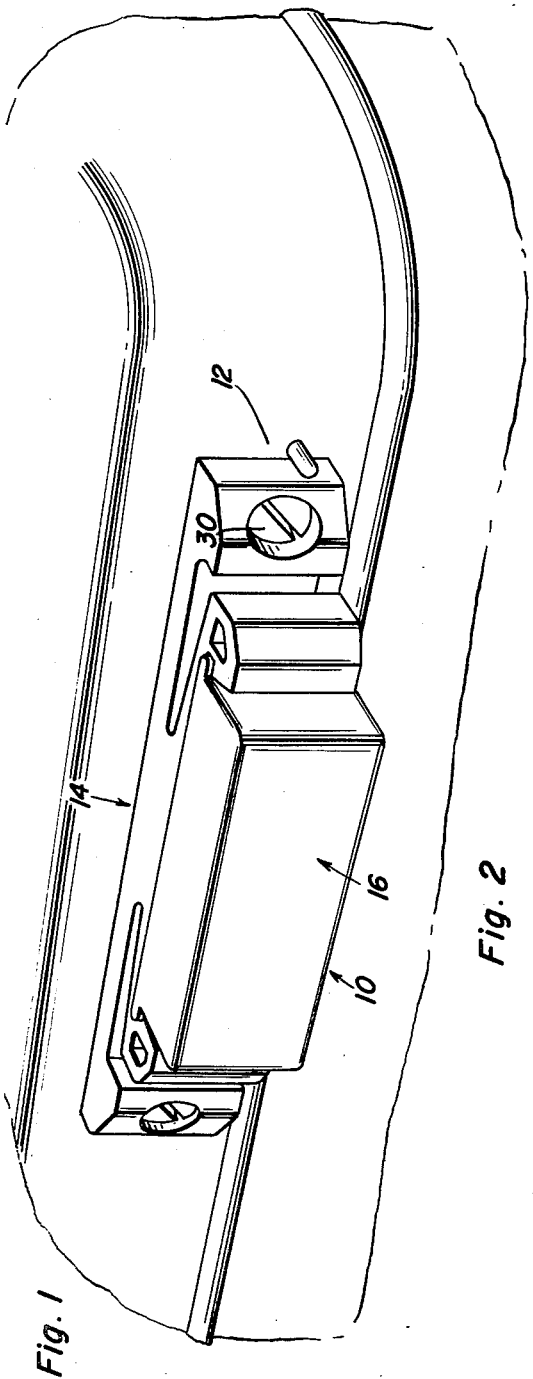
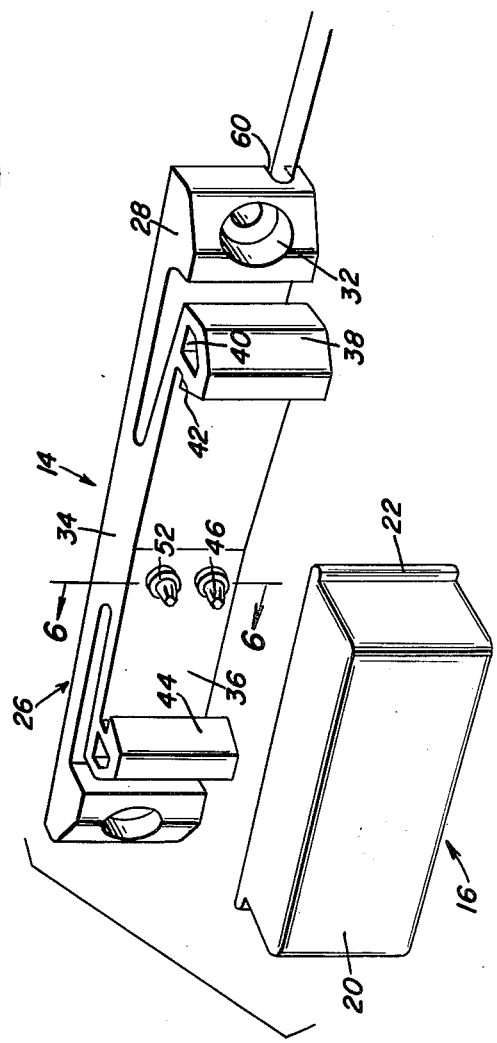
Philip L. Cala
INVENTOR.

Nov. 16, 1965     P. L. CALA     3,218,448
LAMP MOUNTING BRACKET
Filed Oct. 18, 1962     2 Sheets-Sheet 2
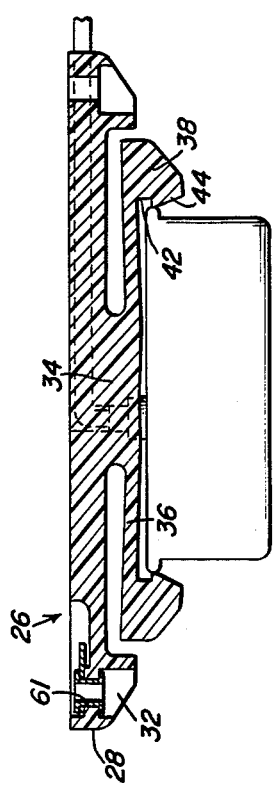
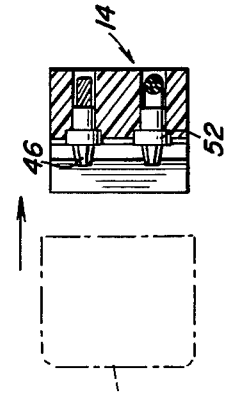
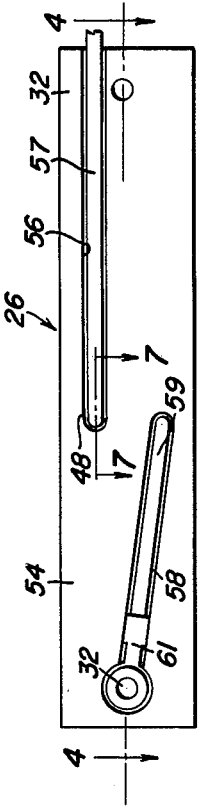
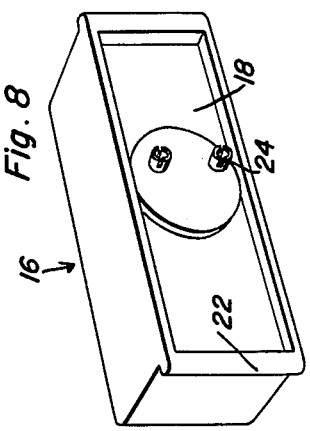
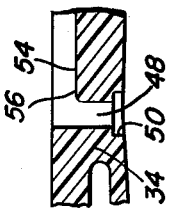
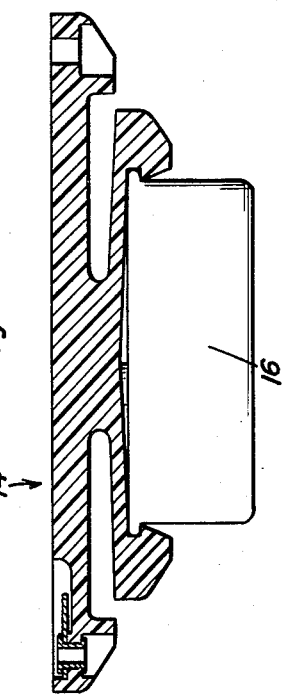
Philip L. Cala
INVENTOR.

United States Patent Office 3,218,448
Patented Nov. 16, 1965

3,218,448
LAMP MOUNTING BRACKET
Philip L. Cala, Jamestown, N.Y., assignor to Truck-Lite Co., Inc., Jamestown, N.Y., a corporation of New York
Filed Oct. 18, 1962, Ser. No. 231,442
11 Claims. (Cl. 240—8.2)

This invention relates to the mounting of lamp assemblies in general and mountings especially suited for the mounting of a lamp on a vehicle supporting surface.

The present invention is concerned with an effective yet economical method of mounting of vehicle lamps on dimensionally restricted supporting surfaces of truck trailers or the like. It is therefore a primary object of the present invention to provide a mounting bracket for vehicle lamps capable of firmly mounting such lamps on dimensionally restricted areas of a vehicle in an economical fashion and providing facilities for easy replacement of such lamps.

Another object of the present invention is to provide a resilient type of lamp mounting bracket for a lamp which does not require the use of fasteners or tools for the mounting and replacement of the lamp unit on the mounting bracket, the mounting bracket being nevertheless capable of firmly holding the lamp unit in place.

An additional object of the present invention is to provide a resilient lamp mounting bracket capable of being easily installed on any dimensionally restricted supporting surface of a vehicle and providing facilities for protecting the conductors and contacts associated with the vehicle lamp and locking them in engagement with the terminal sockets projecting from the lamp.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the lamp assembly shown installed upon a vehicle supporting surface.

FIGURE 2 is a perspective view of the disassembled components of the lamp assembly.

FIGURE 3 is a rear elevational view of the bracket portion of the lamp assembly.

FIGURE 4 is a sectional view of the bracket portion with the lamp being inserted, taken substantially through a plane indicated by section line 4—4 in FIGURE 3.

FIGURE 5 is a sectional view similar to FIGURE 4 illustrating the lamp completely inserted within the bracket.

FIGURE 6 is a transverse sectional view taken substantially through a plane indicated by section line 6—6 in FIGURE 2.

FIGURE 7 is a partial sectional view taken substantially through a plane indicated by section line 7—7 in FIGURE 3.

FIGURE 8 is a perspective view of the sealed beam type of lamp unit associated with the lamp assembly.

Referring now to the drawings in detail, it will be observed that the lamp assembly generally referred to by reference numeral 1 is particularly suited for mounting on a dimensionally restricted supporting surface 12 of a truck trailer for example, as illustrated in FIGURE 1. The lamp assembly includes a bracket portion 14 which is secured to the supporting surface 12 and a sealed beam type of lamp unit 16 removably received by the bracket portion 14. As more clearly seen from FIGURES 2 and 8, any suitable type of lamp unit 16 may be mounted such as a completely sealed unit having a rear base portion 18 and a front light emitting portion 20. Opposite longitudinal ends of the lamp unit 16 at the base portion 18, are provided with projecting flange portions 22 by means of which the lamp unit is retained within the bracket portion 14. Also mounted in the base portion 18, are a pair of contact receiving sockets 24. It will be observed that the sockets 24 are not centrally located but are displaced by a slight amount from the mid-point for purposes to be hereafter explained.

The bracket portion 14 is preferably made of a single piece of plastic or any other suitable material having comparable properties. The bracket includes a mounting section generally referred to by reference numeral 26 which is rectangular in shape and has a substantial longitudinal dimension and relatively narrow width so that it may be secured to the dimensionally restricted supporting surface 12. Formed at the opposite longitudinal ends of the mounting section 26, are anchoring formations 28, which project away from the supporting surface 12 so as to provide sufficient body for the fasteners 30 to anchor the bracket portion 14 to the supporting surface. Recessed openings 32 are therefore formed in the anchoring formations 28 for receiving the fasteners 30 therethrough. The intermediate portion 34 of the mounting section 26 is formed substantially thicker than the rest of the mounting section except for the formations 28. Connected to or integrally formed with the intermediate portion 34, are a pair of relatively thin arms 36 which are resilient or flexible by virtue thereof. The arms extend from the intermediate portion 34 toward the anchoring formations 28 in spaced relation to the mounting section. The arms 36 terminate in spaced relation to the anchoring formations in lamp-retaining enlargements 38. Each of the enlargements 38 is notched out at opposite sides thereof as indicated at 40 so as to reduce the mass thereof. The enlargements form with the resilient arms, a pair of widely spaced recesses 42 adapted to receive therewithin the laterally projecting flange portions 22 of the lamp unit 16. Also, disposed in confronting relation to each other on the enlargements 38, are a pair of bevelled camming surfaces 44 arranged to be engaged by the projecting flange portions 22 of the lamp unit when being inserted so as to deflect the resilient arms 36 toward the mounting section 26 as illustrated in FIGURE 4. Accordingly, when the projecting flange portions 22 are seated within the recesses 42, the resilient arms 36 will spring back because of their elasticity so as to lock the lamp unit in place as illustrated in FIGURE 5.

It will be observed, from FIGURES 2, 6 and 7, that a pair of projecting contact elements 46 are embedded within the intermediate portion 34 of the bracket. Accordingly, the intermediate portion of the bracket is formed with a pair of bores 48 within which the contact elements or terminals 46 are embedded, the bores communicating with recesses 50 adapted to accept nonconductive washers 52 so as to prevent electrolysis between the contacts in wet weather. It will also be observed, that the contacts 46 are positioned unequally between the resilient arms 36 or displaced from the center of the bracket for alignment with the similarly placed terminal engaging sockets 24 on the sealed beam type of lamp unit 16 when the deflected arms 36 deform the intermediate portion 34 as shown in FIGURE 4. Accordingly, after the lamp unit 16 is inserted, between the retaining enlargements 38, the projecting contact elements 46 will assist in positively locking the lamp unit in the bracket as well as to provide the transverse rigidity.

As seen in FIGURES 3, 4, 5 and 7, the rear surface 54 of the mounting section 26 is provided with a pair of channels 56 and 58. These channels are adapted to receive therewithin electrical conductors 57 and 59. Accordingly, each of the channels 56 and 58 communicates with the contact embedding bores 48. The channel 56 extends parallel to the longitudinal sides of the mounting section terminating at an end 60 from which the conductor may extend into the vehicle for supplying energizing current. The channel 58 on the other hand, extends between one of the contact embedding bores 48 and terminal bushing 61 in opening 32 so that the associated contact element may be grounded by the fastener 30. It will therefore become apparent, that the contacts and the conductors associated with the lamp assembly will be protectively disposed between the mounting section 26 and the supporting surface 12.

From the foregoing description, the utility of the lamp assembly and in particular the novel lamp supporting bracket, will be apparent. It will therefore be appreciated, that the mounting assembly is not only economical in construction but effectively and securely mounts any rigid based lamp unit capable of easily being removed or replaced as well as to provide mounting therefor in a dimensionally restricted space. The lamp assembly of the present invention will therefore be particularly useful and find wide acceptance in connection with the mounting of vehicle lights on large trailers or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a lamp having a rigid base, a lamp mounting adapter comprising, an elongated mounting section adapted to be secured to a supporting surface adjacent opposite ends thereof and having an intermediate portion, resilient arms connected to said intermediate portion extending toward said opposite ends in spaced relation to the mounting section and into engagement with the rigid base of the lamp, retaining means mounted on said resilient arms receiving said rigid base of the lamp therebetween, said retaining means comprising, enlargements formed at terminal ends of said resilient arms forming rim receiving recesses, and camming surfaces formed on said enlargements for deflecting said resilient arms toward the mounting section in response to insertion of the rigid base of the lamp therebetween for seating in said rim receiving recesses, and projecting contact means embedded in said intermediate portion unequally spaced from said resilient arms and received in contact receiving socket on the base of the lamp upon deformation of the intermediate portion by the resilient arms for locked engagement with the lamp when seated in the retaining means.

2. The combination of claim 1 wherein said mounting section includes channels formed therein and extending from said opposite ends to the intermediate portion for protectively enclosing conductors against said supporting surface.

3. The combination of claim 2 including anchoring formations disposed at said opposite ends of the mounting section beyond the resilient arms having openings adapted to receive fasteners therethrough for securing the mounting section to the supporting surface, one of said channels terminating in the opening of one of said formations for grounding a conductor by the fastener received therethrough.

4. The combination of claim 3 wherein said mounting section is rectangular in shape with the intermediate portion thereof being thicker than and integral with the resilient arms extending therefrom, said retaining means and anchoring formations being integrally formed respectively on the resilient arms and the mounting section.

5. In combination with a lamp having a rigid base, a lamp mounting adapter comprising, an elongated mounting section adapted to be secured to a supporting surface adjacent opposite ends thereof and having an intermediate portion, resilient arms connected to said intermediate portion extending toward said opposite ends in spaced relation to the mounting section and into engagement with the rigid base of the lamp, retaining means mounted on said resilient arms receiving said rigid base of the lamp therebetween, and projecting contact means embedded in said intermediate portion unequally spaced from said resilient arms and received in contact receiving sockets on the lamp base upon deformation of the intermediate portion by the resilient arms for locked engagement with the lamp when seated in the retaining means.

6. A lamp assembly adapted to be mounted on a relatively narrow supporting surface of a vehicle comprising an elongated mounting adapter having anchoring formations at opposite ends thereof and an intermediate contact mounting portion, a pair of resilient arms connected to said intermediate portion and extending toward said opposite ends terminating in spaced relation to the anchoring formations, a rigid based lamp having projecting sockets and laterally projecting flange portions, retaining means mounted on said resilient arms for deflection thereof when receiving said projecting flange portions of the lamp, and contact means embedded in said intermediate portion unequally spaced from said resilient arms, said contact means being received in the sockets of said lamp when the intermediate portion is deformed by deflection of the resilient arms.

7. The combination of claim 6 wherein said mounting adapter is rectangular in shape with the intermediate portion thereof being thicker than and integral with the resilient arms extending therefrom, said retaining means and anchoring formations being integrally formed respectively on the resilient arms and the mounting adapter.

8. The combination of claim 7, wherein said retaining means comprises enlargements formed at terminal ends of said resilient arms forming rim receiving recesses, and camming surfaces formed on said enlargements for deflecting said resilient arms toward the mounting adapter in response to insertion of the rigid base of the lamp therebetween for seating in said rim receiving recesses.

9. In combination with a supporting surface and a lamp having a rigid base from which terminals extend, a lamp mounting adapter comprising; a mounting section directionally elongated beyond the lamp having an intermediate portion spaced from the rigid base of the lamp and opposite anchoring ends secured to said supporting surface, terminal engaging means mounted by said intermediate portion for alignment with said terminals of the lamp when the intermediate portion is deformed, resilient arms connected to said intermediate portion deforming the intermediate portion when deflected, and base retaining means connected to said resilient arms for deflection thereof when receiving the rigid base of the lamp, whereby the terminals are locked to the terminal engaging means when the rigid base is seated in engagement with the arms.

10. In combination with a lamp having at least one projecting terminal, a lamp holder comprising an elongated elastic member having a deformable portion, terminal engaging means removably mounted by said deformable portion in misaligned relation to the terminal when the deformable portion is in an undeformed state for alignment with said terminal in response to deformation thereof, and lamp receiving means operatively connected to the ends of said elastic member for elastic deformation of the deformable portion in response to insertion of the lamp in the lamp receiving means to lock the terminal engaging means with said terminal when the lamp is seated in the holder and the deformable portion is restored to the undeformed state.

11. The combination of claim 10 wherein said lamp receiving means comprises, a pair of deflection arms connected to said deformable portion, and a pair of spaced retaining elements fixed to said arms for deflection thereof when the lamp is inserted between the retaining elements.

References Cited by the Examiner
UNITED STATES PATENTS

| | | | |
|---|---|---|---|
| 2,208,155 | 7/1940 | Daehler | 240—90 X |
| 2,283,398 | 5/1942 | Van Deventer | 339—21 |
| 2,307,972 | 1/1943 | Strunk | 339—185 |
| 2,688,688 | 9/1954 | Holtz | 240—7.1 |
| 2,700,726 | 1/1955 | Bassler | 240—8.2 |
| 2,931,896 | 4/1960 | Mikola | 240—52.1 |
| 3,025,390 | 3/1962 | Woodcock | 240—90 X |

NORTON ANSHER, *Primary Examiner.*

LAWRENCE CHARLES, *Examiner.*